April 22, 1969
W. W. MARTIN
3,439,506
FLOW CONTROLLING IRRIGATION INSTALLATION
FOR AN UNLINED DITCH
Filed Aug. 25, 1967
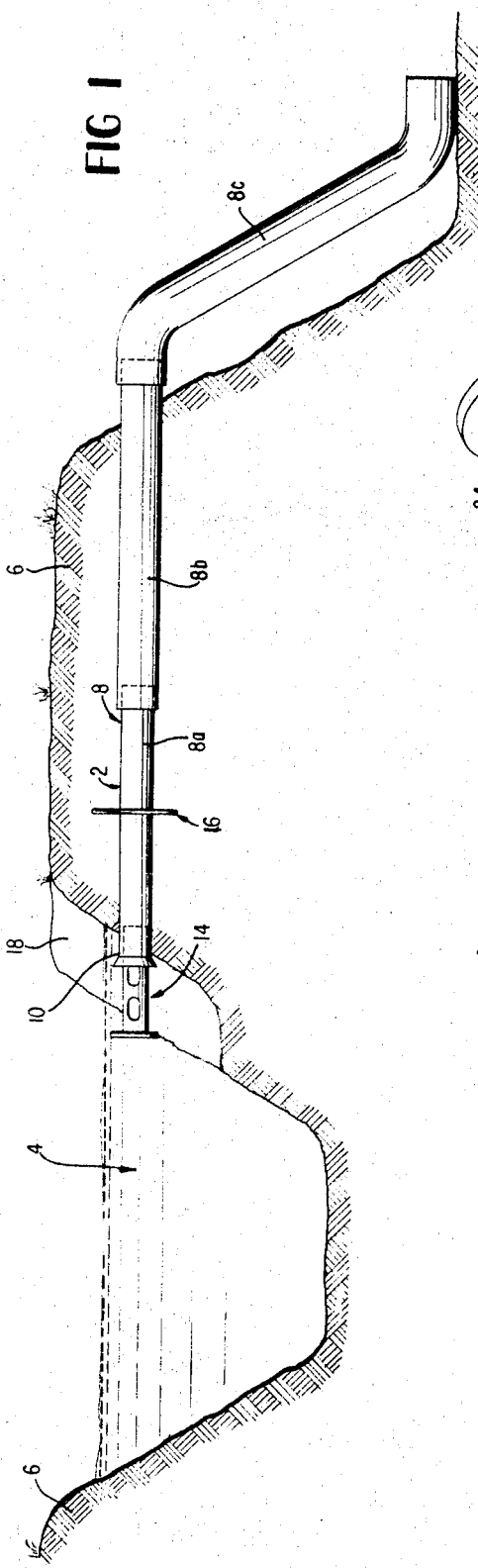
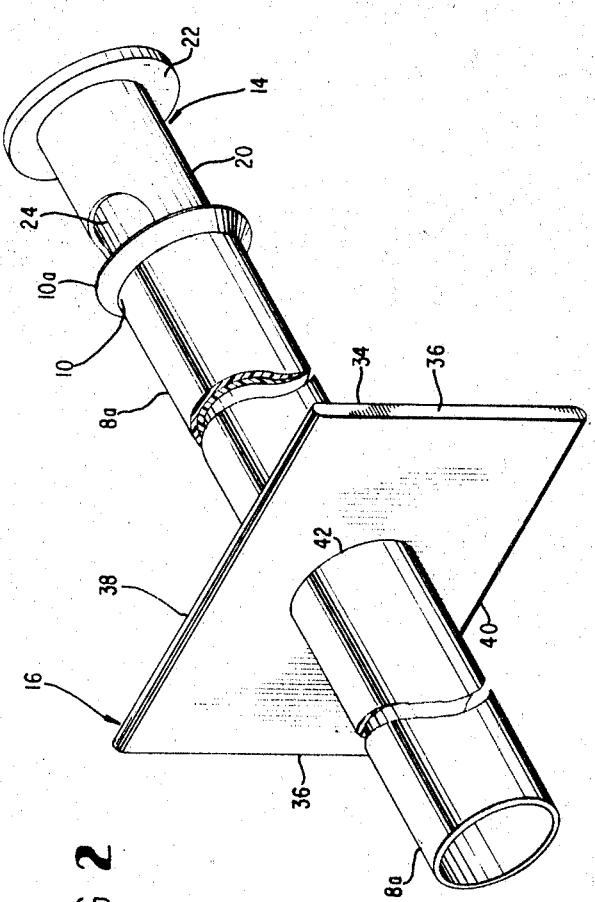
INVENTOR
WILLIS W. MARTIN
BY Burns, Doane, Benedict, Swecker & Mathis
ATTORNEY

United States Patent Office 3,439,506
Patented Apr. 22, 1969

3,439,506
FLOW CONTROLLING IRRIGATION INSTALLATION FOR AN UNLINED DITCH
Willis W. Martin, Box 1550, Riverton, Wyo. 82501
Filed Aug. 25, 1967, Ser. No. 663,431
Int. Cl. E02 *13/02*
U.S. Cl. 61—12                                   2 Claims

ABSTRACT OF THE DISCLOSURE

A flow controlling irrigation conduit for installation in an earthen wall of an unlined irrigation ditch includes an axially extending tubular body adapted to be buried in the earthen wall of a length requisite to extend therethrough. A flow restrictor is frictionally and movably mounted in the body for selective manual movement axially thereof to vary the flow of water through the body. An anchor plate is fixedly secured to and extends about the body intermediate the ends thereof. The anchor plate is disposed in a plane generally perpendicular to a longitudinal axis of the body and is adapted to be buried in the earthen wall to stabilize the body against movement due to forces exerted upon the body during manual adjustment of the flow restrictor, and to prevent loss of water by seepage along the exterior of the outer tube.

Background of the invention

This invention relates to a flow controlling irrigation conduit for installation in an earthen wall of an unlined irrigation ditch.

In irrigating land, it is common to direct water along irrigation ditches from which the water is distributed at suitably spaced points to furrows or the like provided in the surface of the land. Frequently such ditches include two transversely spaced, unlined earthen banks which are provided with side openings spaced at suitable intervals through which the water may be directed to the furrows.

The side openings may be provided in various ways, one of the simplest being a simple channel cut in the earthen wall to permit water to flow out. However, in time the flow of water through the unlined opening may wash away the walls of the opening to such an extent as to cause excessive water loss and additionally it may not be possible to effect selective control of water flow.

In order therefore to overcome these disadvantages, there has been devised at least one flow controlling irrigation conduit comprising a rigid tube adapted to be buried in and extend through the unlined earthen walls having a manually adjustable flow controlling valve. Prior structures of this type may, however, prove unsatisfactory for a number of reasons. For example, the flow controlling valve may be fairly stiff to adjust so that manual leverage and translation forces exerted on the conduit, necessarily incident upon adjustment of the flow controlling valve, may cause movement of the conduit as a whole in the surrounding soil. Such movement may loosen the earth around the conduit in such a manner as to cause serious local weakening of the wall of the ditch or to create an opening around the conduit through which water can escape.

Another disadvantage may arise due to the tendency of water in the ditch to seep along the exterior of the conduit, thereby causing an unwanted loss of water through the wall.

For these reasons, there is a need for a flow controlling irrigation conduit which may be installed in an unlined earthen sidewall of an irrigation ditch, in which loss of water along the exterior of the tube is minimized and in which operation of a flow control device associated with the conduit does not eventually cause local weakening of the wall.

Summary of the invention

It is therefore a general object of the invention to provide a flow controlling irrigation conduit designed to minimize problems of the type described.

It is a particular object of the invention to provide a flow controlling irrigation conduit for installation in an earthen wall of an unlined irrigation ditch wherein the possibility of loss of water through seepage along the exterior of the conduit is effectively minimized.

It is a further object of the invention to provide a flow controlling irrigation conduit provided with a manually operated flow control device for installation in an earthen wall of an unlined irrigation ditch, wherein repeated adjustment of the flow control device does not cause motion of the tube in the wall sufficient to cause local weakening thereof.

These objects are accomplished in accordance with a preferred embodiment of the invention by a flow controlling irrigation conduit adapted for installation in an earthen wall of an unlined irrigation ditch. The conduit includes an axially extending tubular body adapted to be buried in the earthen wall with an open inner end of the body projecting into the ditch. An anchor plate is fixedly secured to and extends about the tubular body intermediate the ends thereof. A flow restrictor is frictionally and movably mounted in the body for selective manual movement axially thereof to vary the flow of water through the body. The anchor plate lies in a plane disposed generally perpendicular to a longitudinal axis tube and is adapted to be buried in the earthen wall to stabilize the tube against movement in the earth due to forces exerted on the body during manual adjustment of the flow restrictor, and to prevent seepage of water along the exterior of the tube.

The drawings

A preferred embodiment of the invention is illustrated in the accompanying drawings in which:

FIGURE 1 is a transverse, cross-sectional view of a portion of an unlined irrigation ditch provided with a flow controlling irrigation conduit according to the present invention; and FIGURE 2 is a perspective view, partially broken away, of the flow controlling irrigation conduit shown in FIGURE 1.

Detailed description

Referring to FIGURE 1 of the drawings, an irrigation conduit 2 according to one preferred embodiment of the present invention is shown installed in a water-filled irrigation ditch 4 having two unlined earthen banks 6. The conduit 2 includes an outer tubular body 8 (shown as comprising two partially telescoped tubes 8a and 8b, although it will be realized that a single tube may be provided) buried in and extending transversely through the earthen wall. The tubular body 8 includes an open inner end 10 projecting into the water in the ditch and provided with a manually adjustable flow restrictor 14. The tubular body 8 is provided with an anchor plate 16 fixedly secured to and extending about the tubular body 8 and buried in the earthen wall. The anchor plate 16 stabilizes the body 8 against movement in the earth likely to be caused by manual adjustment of the flow restrictor 14, thus preventing local weakening of the wall 4. In addition, the anchor plate 16 also prevents seepage of water along the exterior of the tubular body 8, thus preventing unwanted loss of water and local erosion of the wall 4.

Referring in more detail to FIGURE 2, the previously mentioned outer tube 8a may be seen to be of cylindrical form, although other cross-sectional shapes may be provided if desired. The inner end 10 of the tube 8a is provided with an outwardly belled portion 16. The other end of the tube 8a is sleeved with the previously mentioned second tube 8b which is in its own turn sleeved by an elbow tube 8c adapted to direct water to the area to be irrigated. Obviously, however, the separate tubes 8a, 8b and 8c or any two adjacent tubes thereof could be formed as a single tube if so desired.

In the installation of the conduit 6 it is advisable to provide a recess 18 extending transversely in and of the wall of the ditch within which the inlet 10 and flow restrictor 14 may be received, so that they are not exposed to the action of ditching devices periodically utilized to clear growing vegetation from the interior walls of the ditch.

In the preferred embodiment the previously mentioned flow restrictor 14 comprises an inner tube 20 concentric with and tightly telescopingly related to the outer tube 8a. The tube 20 has a closed inner end 22 and is provided with a plurality of axially spaced openings 24 which may be selectively uncovered to control flow of water through the openings and out through the outer tube. A more detailed description of the flow restrictor 14 is provided in applicant's copending application Ser. No. 587,748, filed Oct. 19, 1966, now abandoned, and in the continuation-in-part application thereof, Ser. No. 662,257, filed on Aug. 1, 1967. However, it will be appreciated that other forms of flow restrictor 14 may be used in conjunction with the outer tube 8, if particular circumstances should make this desirable.

In order to reduce the possibility that axial frictional forces, necessarily exerted upon the tube 8a by the flow restrictor 14 during manual adjustment of the flow restrictor 14, will cause linear movement of the outer tube 8a relative to the surrounding soil in opposite axial directions (dependent on whether flow is being increased or decreased) which would cause local weakening of the bank and increase the possibility of water loss along the exterior of the tube, the previously mentioned anchor plate 16 is provided. The anchor plate 16 is of rectangular form, including flat inner and outer faces 34 and 36, defined by two vertical edges 38 disposed on opposite sides of the tube 8a, and two transverse edges 40 disposed above and below the tube 8a. It will be appreciated that anchor plates of other shape such as round, polygonal or irregular peripheral configuration may be provided. An aperture 42 extends through the plate 16 and is positioned generally centrally thereof. The aperture 42 slidably but very tightly and frictionally receives the outer tube 8a and may be assembled thereonto at the site of use by sliding the plate 16 along the tube 8a to a point generally adjacent the midpoint thereof. Additionally, the plate 16 is sealingly bonded to the tube 8a by suitable adhesive.

During installation a transverse channel is dug in the earthen wall to receive the tubes 8a, 8b and the anchor plate 16, after which they are covered with earth. In this buried position, the inner and rear surfaces 38 and 40 of the anchor plate bear against the adjacent soil to resist axial frictional forces, in directions both inwardly and outwardly of the ditch, exerted upon the tube 8a by the flow restrictor 14 during manual adjustment thereof, so that axial movement of the tube 8a relative to the soil both inwardly and outwardly of the ditch is effectively eliminated. In addition, the anchor plate 16 is further of sufficient rigidity to resist any leverage forces exerted on the tube 8a arising during manual adjustment of the flow restrictor 14. It will be appreciated that the stabilizing effect provided by the anchor plate 16 in this manner substantially avoids local weakening of the earthen bank adjacent the conduit during repeated adjustment of the flow restrictor 14 over protracted periods of use.

In addition, water seeping from the interior of the ditch along the exterior of the pipe 8a can proceed only as far as the anchor plate 16, after which its further passage is checked by the anchor plate, thus reducing loss of water through seepage and erosion of the earthen wall 4.

In order to minimize the deleterious effect of weather conditions encountered in normal use of the flow control device, such as those caused by freezing of the water, harsh sunlight, acidity of the soil, and also to avoid the ill effects of rusting, the tubes 8a, 8b and 8c, the flow restrictor 14 and the anchor plate 16 are preferably made of plastic material such as polyethylene or the like. However, it will be appreciated that other suitable materials may be employed.

In utilizing a flow controlling irrigation conduit according to the present invention, it will be seen that effective control of water flow from an unlined earthen ditch may be maintained over long periods without deterioration in the condition of the walls of the ditch.

In particular, the anchor plate stabilizes the outer body against movement due to any forces exerted on the tube necessarily incident upon adjustment of the flow restrictor, thus avoiding localized weakening of the wall of the earthen ditch.

In addition, the anchor plate prevents seepage of water outwardly along the exterior of the conduit such as might lead to undesirable loss of water or erosion of the walls of the ditch.

Although the invention has been described with reference to a preferred embodiment, it will be apparent to those skilled in the art that additions, deletions, modifications, substitutions and other changes not specifically described as illustrated in the preferred embodiment may be made within the purview of the appended claims.

I claim:
1. An irrigation conduit installation in an earthen wall of an unlined irrigation ditch comprising,
   an axially extending tubular body buried in the earthen wall with an open intake end of said body projecting into the ditch, said body being of a length requisite to extend a substantial distance into the earthen wall, said body being in fluid communication with an outlet of the conduit installation on the side of the earthen wall opposite said intake end;
   a tubular inner member having a closed end and an open end, said inner member having a diameter permitting relatively tight, telescoping thereof open end first into said intake end of said tubular body to close said tubular body when in fully telescoped position, movement of said inner member axially of said tubular body frictionally imposing axial forces on said tubular body tending to move said tubular body axially in the earth;
   said inner member having at least one opening in the wall thereof, various extents of which opening may be exposed beyond the intake end of said tubular body to effect control of the amount of water permited to flow in through said irrigation conduit installation; and
   rigid anchor plate fixedly secured about and extending outwardly transversely of said tubular body intermediate the ends thereof at a fixed axial location on said tubular body, said anchor plate being entirely buried in the earthen wall to stabilize the tubular body against axial movement inwardly and outwardly of the ditch during manual adjustment of said flow restrictor.

2. An irrigation conduit as defined in claim 1 wherein said anchor plate further includes,
   a rigid rectangular sheet having a thickness substantially less than the length of said tubular body and positioned adjacent the midpoint thereof.

(References on following page)

References Cited

UNITED STATES PATENTS

| | | | |
|---|---|---|---|
| 559,651 | 5/1896 | Willard | 251—353 |
| 625,860 | 5/1899 | Thornton | 61—12 |
| 648,455 | 5/1900 | Farson | 251—353 X |
| 1,905,919 | 4/1933 | Levis | 210—460 |
| 2,776,169 | 1/1957 | Aschenbrenner | 61—12 X |
| 2,393,867 | 1/1946 | Nicholson | 285—424 X |

EARL J. WITMER, *Primary Examiner.*

U.S. Cl. X.R.

61—18